(12) United States Patent
Day et al.

(10) Patent No.: US 6,887,969 B2
(45) Date of Patent: May 3, 2005

(54) METHOD AND APPARATUS TO MAKE HIGH MOLECULAR WEIGHT MELT POLYCARBONATE

(75) Inventors: James Day, Scotia, NY (US); Patrick J. McCloskey, Watervliet, NY (US); Paul M. Smigeiski, Jr., Schenectady, NY (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 10/264,640

(22) Filed: Oct. 4, 2002

(65) Prior Publication Data

US 2004/0068086 A1 Apr. 8, 2004

(51) Int. Cl.$^7$ .............................................. C08G 64/00
(52) U.S. Cl. .................... 528/196; 264/176.1; 264/219; 528/198
(58) Field of Search .............................. 264/176.1, 219; 528/196, 198

(56) References Cited

U.S. PATENT DOCUMENTS

| | | | |
|---|---|---|---|
| 4,323,668 A | | 4/1982 | Brunelle |
| 6,245,878 B1 | * | 6/2001 | Ito ............................. 528/196 |
| 6,414,178 B1 | | 7/2002 | Silva et al. |

FOREIGN PATENT DOCUMENTS

| | | |
|---|---|---|
| EP | 0 764 673 B1 | 11/1999 |
| JP | 10036497 | 2/1998 |
| JP | 10101786 | 4/1998 |
| JP | 10101787 | 4/1998 |
| JP | 11302228 | 11/1999 |
| JP | 2001158821 | 6/2001 |
| WO | WO 98/45246 | 10/1998 |
| WO | WO 99/47580 | 9/1999 |
| WO | WO 00/63274 | 10/2000 |

* cited by examiner

Primary Examiner—Terressa Boykin
(74) Attorney, Agent, or Firm—Oppedahl & Larson LLP

(57) ABSTRACT

Usually, polycarbonate polymerization is limited by the rate at which inhibitory byproducts, such as phenol and salicylate, can be removed from the reaction. To facilitate the removal of volatile reaction byproducts from the reaction as polymerization occurs, the present invention provides a spray mist reactor. The formation of a spray mist polymerization reaction allows for the creation of an enormous surface area for exchange of volatile byproducts. The present invention is applicable to polymerization of polycarbonate and its copolymers starting with monomers or oligomers. The invention may be used to increase throughput and minimize initial investment for a give melt process, especially the fast reacting bis(methylsalicylate) carbonate process.

80 Claims, 1 Drawing Sheet

METHOD AND APPARATUS TO MAKE HIGH MOLECULAR WEIGHT MELT POLYCARBONATE

BACKGROUND OF THE INVENTION

The present invention relates to the synthesis of polycarbonate by melt polymerization. More particularly, the present invention describes methods and systems for polymerization of polycarbonate as a spray to facilitate volatilization of inhibitory reaction byproducts and thereby increase the rate at which polymerization occurs.

Polycarbonates, such as bisphenol A polycarbonate, are typically prepared either by interfacial or melt polymerization methods. The reaction of a bisphenol such as bisphenol A (BPA) with phosgene in the presence of water, a solvent such as methylene chloride, an acid acceptor such as sodium hydroxide, and a phase transfer catalyst such as triethylamine is typical of the interfacial methodology. The phase transfer catalyst improves the solubility of the phenolate in the organic phase and greatly speeds the reaction. Alternatively, polycarbonates may be made by ester exchange using, for example, dimethyl carbonate or diphenyl carbonate. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First, it is a disadvantage to operate a process which requires phosgene as a reactant due to known safety concerns. Second, because the process requires using large amounts of an organic solvent, expensive precautions must be taken to guard against any adverse environmental impact. Third, the interfacial method requires a relatively large amount of equipment and capital investment. Fourth, the polycarbonate produced by the interfacial process may be prone to inconsistent color, higher levels of particulates, and higher chloride content, which can cause corrosion.

The melt method, although obviating the need for phosgene or a solvent such as methylene chloride, requires high temperatures and relatively long reaction times. As a result, by-products may be formed at high temperature, such as the products arising by Fries rearrangement during polymerization. Fries rearrangement gives rise to undesired and uncontrolled polymer branching which may negatively impact the polymer's flow properties and performance. The melt method further requires the use of complex processing equipment capable of operation at high temperature and low pressure, and capable of efficient agitation of the highly viscous polymer melt during the relatively long reaction times required to achieve high molecular weight.

Using salicyl carbonate as a substitute for diphenylcarbonate allows for significantly faster reaction rates and more favorable equilibrium in melt polymerization reactions. For example, it has been reported that melt polycarbonate can be formed under relatively mild conditions by reacting a bisphenol such as BPA with the diaryl carbonate formed by reaction phosgene with methyl salicylate (U.S. Pat. No. 4,323,668 and WO99/47580). Also, polycarbonates comprising salicylic ester derivatives may be generated to have excellent optical tone and/or color hue (see e.g., WO00/63274; WO98/45246; JP10036497; JP10101786; JP10101787; and JP11302228) and thermal stability (JP2001158821). Still, relatively high levels of transesterification catalysts are generally required to produce high molecular weight polycarbonate using reported methods. Another significant drawback is that the salicylate formed as a byproduct of the reaction inhibits the reaction from proceeding.

What is needed is a simple method to promote the formation of polycarbonate using diaryl carbonates such as bis(methyl salicyl) carbonate that allow for mild reaction conditions while promoting the removal of inhibitory byproducts. Ideally, the method can be incorporated into the production of commercially suitable polycarbonate using existing equipment and protocols. Also ideally, the method will allow polymerization using conditions that are relatively mild (i.e. <400° C.) and for short time periods to minimize the generation of Fries byproduct and/or the breakdown of the polycarbonate product while still allowing for efficient volatilization of inhibitory salicylate byproduct.

BRIEF DESCRIPTION OF THE INVENTION

The invention describes methods and a novel reactor design for spray polymerization of polycarbonate and its copolymers. By facilitating the removal of volatile byproducts as polymerization occurs, the invention can be used to increase throughput and minimize initial investment of any given melt process, especially the fast reacting bis(methyl salicyl) carbonate (BSMC) process.

In one aspect, the present invention provides a method for the production of high molecular weight polycarbonate comprising:

(a) melting monomers comprising an ester-substituted diaryl carbonate and a dihydroxy aromatic compound and mixing with at least one melt polymerization catalyst to generate a pre-polymerization reaction melt;

(b) treating the reaction mix to generate a mist of defined droplet size;

(c) exposing the mist to a high temperature environment at reduced pressure such that the monomers polymerize; and (d) collecting polymerized polycarbonate product.

In another aspect, the present invention comprises an apparatus for the generation of high molecular weight polycarbonate comprising:

(a) a means to melt monomers comprising at least one ester-substituted diaryl carbonate and at least one dihydroxy aromatic compound and to mix the monomers with at least one melt polymerization catalyst to generate a pre-polymerization reaction mix;

(b) a device to generate a fine mist of predetermined droplet size from the pre-polymerization reaction mix;

(c) a reaction vessel for exposing the mist to a high temperature environment under reduced pressure such that said monomers polymerize and at least a portion of at least one volatile reaction byproduct separates from said droplets;

(d) a vent to remove at least a portion of said volatile byproducts from the droplets; and (e) a device to collect the polymerized polycarbonate product from the reaction vessel.

DETAILED DESCRIPTION OF THE INVENTION

Figure 1:
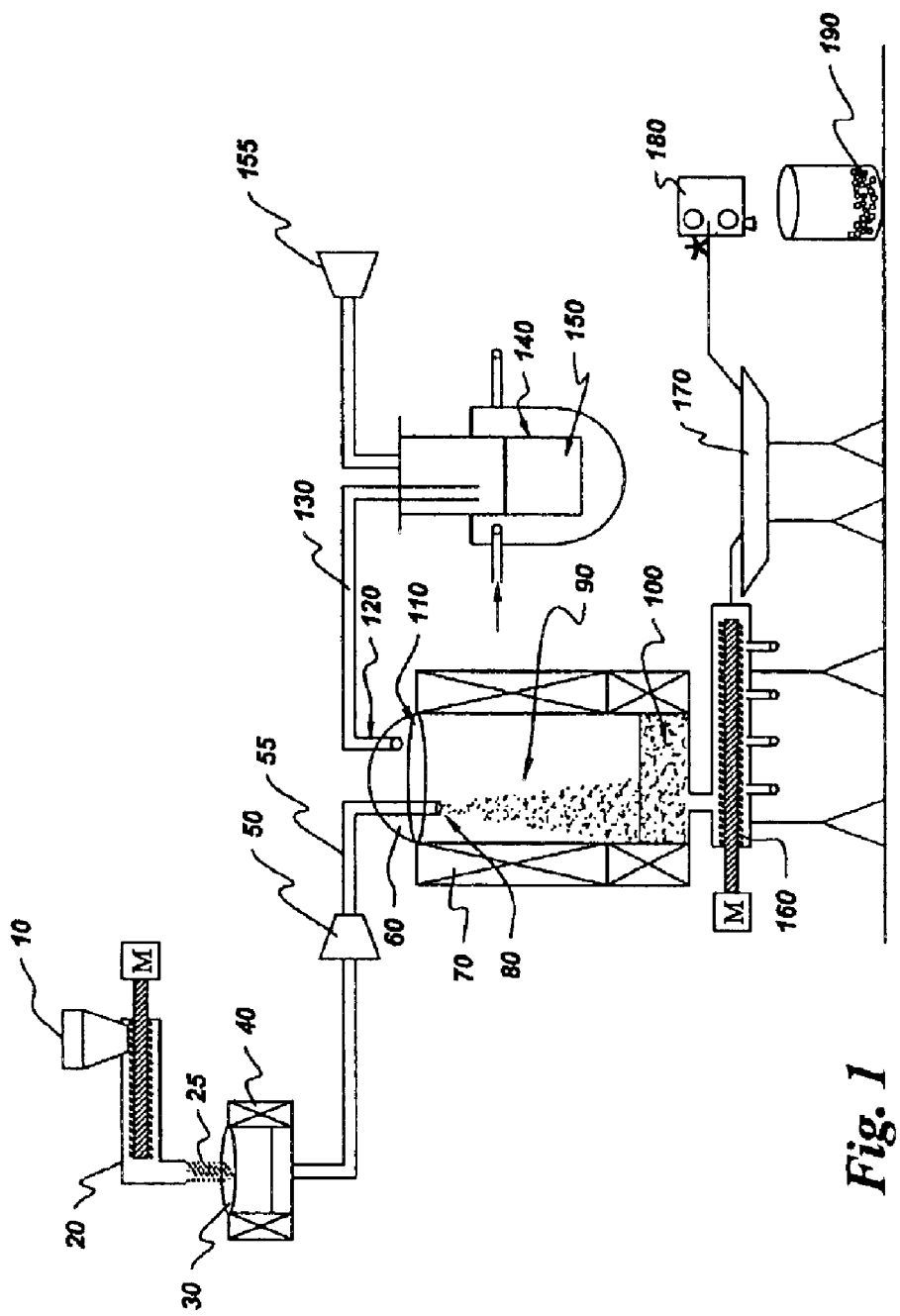
FIG. 1 illustrates a schematic of an apparatus for spray polymerization of polycarbonate in accordance with an embodiment of the present invention showing: 10—port to introduce monomers; 20—mixer feeder; 25—monomers; 30—melt tank; 40—heater(s); 50—heated pump; 55—heated transfer line; 60—reaction vessel; 70—heater (s); 80—spray nozzle; 90—mist particulates; 100—polymerparticles; 110—screen; 120—vacuum port; 130—evacuation line; 140—cold trap; 150—condensate; 155—vacuum pump; 160—vented extruder; 170—cooling trough; 180—pelletizer; and 190—polycarbonate product pellets.

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural references unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyestercarbonates.

As used herein, the term "melt polycarbonate" refers to a polycarbonate made by the transesterification of a diaryl carbonate with a dihydroxy aromatic compound.

"BPA" is herein defined as bisphenol A or 2,2-bis(4-hydroxyphenyl)propane.

"Catalyst system" as used herein refers to the catalyst or catalysts that catalyze the transesterification of the bisphenol with the diaryl carbonate in the melt process.

"Catalytically effective amount" refers to the amount of the catalyst at which catalytic performance is exhibited.

As used herein the term "cp" is defined as centipoise, a measure of viscosity.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product comprises structure VII below, which affords 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "monofunctional phenol" means a phenol comprising a single reactive hydroxy group.

The terms "vent port" and "vent" are used interchangeably herein.

As used herein the term "volatile" means that the referenced compounds has an appreciable vapor pressure at ambient temperature and pressure. In particular, volatile compounds evaporate at temperatures at which melt polymerization of polycarbonate is typically conducted.

As used herein the term volatilization means promoting the evaporation of one compound from a non-volatile mixture.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valence of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

The reaction rate for the formation of polycarbonate by melt polymerization is limited by the rate at which inhibitory byproducts such as, but not limited to, salycilate and phenol, can be removed from the melt. To facilitate the rate of removal of volatile byproducts, the present invention describes a reactor which allows polymerization to occur as a spray mist. The spray mist results in the creation of a large exchange surface area which thereby facilitates the removal of reaction byproducts and other volatiles from the polymerization reaction. The creation of large interfacial area through the formation of fine droplets at temperatures between 200° C. and 350° C. provides for relatively small path lengths for the diffusion of salycilate (or other volatile byproducts) out of the droplets, thereby allowing the polymerization reaction to proceed rapidly. The residence time of the droplets is of the order of seconds to minutes, depending on the reactor design and the "activity" of the catalyst(s). A further advantage is that higher than normal temperatures for the polymerization reaction can be used since the heat history the material experiences will be short.

In one aspect, the present invention provides a method for the production of high molecular weight polycarbonate comprising:

(a) melting monomers comprising an ester-substituted diaryl carbonate and a dihydroxy aromatic compound and mixing with at least one melt polymerization catalyst to generate a pre-polymerization reaction mix;

(b) treating the reaction mix to generate a mist of defined droplet size;

(c) exposing the mist to a high temperature environment at reduced pressure under conditions such that said monomers polymerize; and (d) collecting polymerized polycarbonate product.

In another aspect, the present invention provides a method for preparing polycarbonate comprising:

(a) melting monomers comprising a dihydroxy aromatic compound and bis(methyl salicyl) carbonate and mixing with a transesterification catalyst to generate a pre-polymerization reaction mix;

(b) treating the mix to generate a fine mist of predetermined droplet size;

(c) exposing the mist to a high temperature environment at reduced pressure under conditions such that said monomers polymerize and at least a portion of at least one volatile reaction byproduct separates from said droplets;

(d) removing at least a portion of said volatile byproducts from the droplets; and (e) collecting polymerized polycarbonate product.

Thus, in an embodiment, the method includes a step by which at least a portion of at least one volatile reaction byproduct is separated from the droplets. Also, in an embodiment, the catalyst is added separately from the monomers, but prior to formation of the mist. Preferably, the method of the present invention provides for continuous removal of volatile byproducts as they are formed. For example, in an embodiment, salicylate byproduct is evaporated from a polymerization spray and the vapors removed via a vent. The salicylate is then condensed and discarded in liquid form.

Preferably, the polymerization is conducted in a vacuum ranging from 0.1 to 700 torr. More preferably, the polymerization is conducted in a vacuum ranging from 0.1 to 50 torr. Even more preferably, the polymerization is conducted in a vacuum ranging from 0.1 to 5 torr.

Also, preferably, the temperature at which said monomers are melted ranges from 125° C. to 250° C. Even more preferably, the temperature at which said monomers are melted ranges from 140° C. to 200° C. In an embodiment, the temperature at which said monomers are melted is about 150° C.

In an embodiment, the majority of droplets have a defined range of size to promote exchange of volatile reaction byproducts. Preferably, the majority of the droplets in the mist range in size from 1–1,000 microns. More preferably, the majority of the droplets in the mist range in size from 1–400 microns. Even more preferably, the majority of the droplets in the mist range in size from 5–50 microns.

Also, in an embodiment, the droplets in the mist will have a preferred range of viscosity, to promote exchange of volatile byproducts. Preferably, the viscosity of the droplets ranges from 0.5 to 500 cp. More preferably, the viscosity of the droplets ranges from 1 to 200 cp, and even more preferably from 5 to 90 cp.

In an embodiment, the device to generate the mist comprises a spray nozzle or an atomizer. Preferably, the device to generate the mist comprises an airless spray nozzle, an atomizer, a rotary atomizer or any other device capable of increasing the surface area of a fluid.

The method of the invention is unique in that it allows for polymerization to occur very rapidly. Thus, the polymer may be exposed to fairly high temperatures with only a short "residence time" at the elevated temperature. Preferably, the temperature used for polymerization ranges from 200° C. to 400° C. More preferably, the temperature used for polymerization ranges from 250° C. to 350° C. Even more preferably, the temperature used for polymerization ranges from 280° C. to 320° C.

The present invention is unique in that high molecular weight polycarbonate is generated within minutes and preferably, with in seconds of exposure to high temperature melt conditions. In an embodiment, the pre-polymerization reaction mix monomers are partially polymerized to comprise, at least in part, oligomers. Also, in an embodiment, using higher temperatures for polymerization results in product being formed more quickly. Thus, an advantage of the present invention is that polymers are exposed to the elevated temperatures typical of melt polymerization for very short periods of time.

In an embodiment, polymerization is allowed to occur for time period required to generate the polymer of interest. Preferably, polymerization comprises time periods of 5 minutes or less. More preferably, polymerization comprises time periods of 3 minutes or less. Even more preferably, polymerization comprises time periods of 1 minute or less.

The ester-substituted diaryl carbonates according to the present invention include diaryl carbonates having structure I

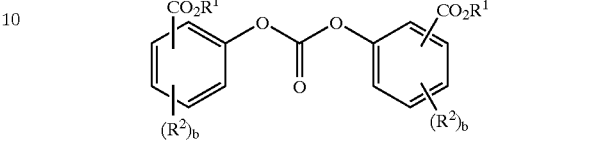

wherein $R^1$ is independently at each occurrence $C_1$–$C_{30}$ alkyl group, $C_4$–$C_{30}$ cycloalkyl group, or $C_4$–$C_{30}$ aryl group, $C_1$–$C_{30}$ alkoxyl, $C_6$–$C_{30}$ aryloxy, $C_6$ to $C_{30}$ aralkyl, $C_6$ to $C_{30}$ aralkyloxy, $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, and $C_1$–$C_{20}$ acylamino group; and b is independently at each occurrence an integer 0–4. In an embodiment, bifunctional carbonyls such as those described in WO99/47580 are used.

Ester-substituted diaryl carbonates I are exemplified by bis(methyl salicyl) carbonate (CAS Registry No. 82091-12-1), bis(ethyl salicyl) carbonate, bis(propyl salicyl) carbonate, bis(butyl salicyl) carbonate, bis(benzyl salicyl) carbonate, bis(methyl 4-chlorosalicyl) carbonate and the like. Typically bis(methyl salicyl) carbonate is preferred.

The dihydroxy aromatic compounds according to the present invention include bisphenols having structure II $$\underset{R^3}{\overset{R^5}{\underset{\big|}{R^4}}}\;\;\text{(structure shown)}$$

wherein $R^3$–$R^{10}$ are independently a hydrogen atom, halogen atom, nitro group, cyano group, $C_1$–$C_{30}$ alkyl group $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group, $$R^{12}\diagdown_C\diagup R^{11}$$

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof. In an embodiment, the dihydroxy aromatic compounds comprise alkyl or alkylene esters.

Suitable bisphenols II are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene. Bisphenol A is preferred.

The polycarbonate prepared according to the method of the present invention comprises ester substituted phenoxy endgroups having structure III

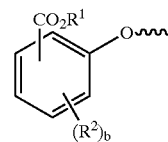

wherein $R^1$ and $R^2$ are defined as in structure I and b is an integer 0–4; or endgroups derived from structure III, for example, endgroups introduced by displacement of an ester substituted phenoxy endgroup having structure III by a monofunctional phenol such as p-cumylphenol. In one embodiment of the present invention structure III is the methyl salicyl group IV. The methyl salicyl endgroup IV is preferred.

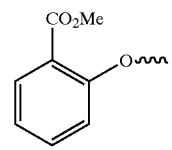

The transesterification catalyst may be added to the melt at any point prior to formation of the mist. Thus, in an embodiment, the catalyst is added prior to melting the monomers, and mixed with the monomers as melting occurs. Alternatively, the catalyst may be added during melting or just after the monomers have been melted. The present invention also includes the embodiment where the catalyst (or several catalysts) are added as the melted monomers are pumped towards the vessels where the mist droplets are formed. For example, the catalyst may be injected into the melted monomers just prior to formation of the mist.

Suitable transesterification catalysts according to the method of the present invention include salts of alkaline earth metals, salts of alkali metals, quaternary ammonium compounds, quaternary phosphonium ions, and mixtures thereof. Suitable transesterification catalysts include quaternary ammonium compounds comprising structure V

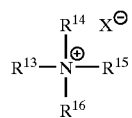

wherein $R^{13}$–$R^{16}$ are independently a $C_1$–$C_{20}$ alkyl group, $C_4$–$C_{20}$ cycloalkyl group or a $C_4$–$C_{20}$ aryl group and $X^-$ is an organic or inorganic anion. Anions $X^-$ include hydroxide, halide, acetate, carboxylate, phenoxide, sulfonate, sulfate, carbonate, and bicarbonate. In one embodiment of the present invention the transesterification catalyst comprises tetramethylammonium hydroxide.

Suitable transesterification catalysts include quaternary phosphonium compounds comprising structure VI

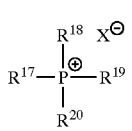

wherein $R^{17}$–$R^{20}$ are independently a $C_1$–$C_{20}$ alkyl group, $C_4$–$C_{20}$ cycloalkyl group or a $C_4$–$C_{20}$ aryl group and $X^-$ is an organic or inorganic anion as defined for structure V. In one embodiment of the present invention the transesterification catalyst comprises tetrabutylphosphonium acetate.

Where $X^-$ is a polyvalent anion such as carbonate or sulfate it is understood that the positive and negative charges in structures V and VI are properly balanced. For example, where $R^{17}$–$R^{20}$ in structure VI are each methyl groups and $X^-$ is carbonate, it is understood that $X^-$ represents ½ $(CO_3^{-2})$.

The transesterification catalyst may according to the method of the present invention comprise at least one alkali metal hydroxide, alkaline earth hydroxide or mixture thereof. In an embodiment, the hydroxide is added in addition to a quaternary ammonium compound such as V, a quaternary phosphonium compound such as VI, or a mixture thereof. Sodium hydroxide in combination with tetrabutylphosphonium acetate illustrates such mixed catalyst systems. In catalyst systems comprising quaternary "onium" compounds such as V or VI together with a metal hydroxide such as sodium hydroxide, it is frequently preferred that the amount of "onium" compound be present in excess relative to the metal hydroxide, preferably in an amount corresponding to from about 10 to about 250 times the amount of metal hydroxide employed.

In one embodiment of the present invention the transesterification catalyst comprises at least one alkali metal salt of a carboxylic acid, an alkaline earth metal salt of a carboxylic acid or a mixture thereof. Salts of ethylene diamine tetracarboxylic acid (EDTA) have been found to be particularly effective, among them $Na_2Mg$ EDTA.

In yet another embodiment of the present invention the transesterification catalyst comprises the salt of a nonvolatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids according the present invention are alkali metal salts of phosphites; alkaline earth metal salts of phosphites; alkali metal salts of phosphates; and alkaline earth metal salts of phosphates. Suitable salts of nonvolatile acids include $NaH_2PO_3$, $NaH_2PO_4$, $Na_2H_2PO_3$, $KH_2PO_4$, $CsH_2PO_4$, $Cs_2H_2PO_4$, and mixtures thereof. In one embodiment, the salt of the nonvolatile acid is $CsH_2PO_4$. In one embodiment of the present invention the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

The amount of transesterification catalyst present according to the method of the present invention is in a range between about $1\times10^{-8}$ and about $1\times10^{-3}$, preferably between about $1\times10^{-7}$ and about $1\times10^{-3}$, and still more preferably between about $1\times10^6$ and about $5\times10^{-5}$ moles catalyst per mole dihydroxy aromatic compound.

In an embodiment, small quantities of branching agents are incorporated into the low viscosity melt. Thus, in an embodiment, the invention may encompass the inclusion of at least one branching agent such as a trifunctional or higher functional alcohol, a trifunctional or higher carboxylic acid, or a trifunctional or higher functional phenol. Suitable branching agents include, for example, trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2, 4-dihydroxyphenyl)-propane, tetra-(4-[4-hydroxyphenylisopropyl]-phenoxy)-methane, 1,4-bis-[(4,4-dihydroxytriphenyl)methyl]-benzene.

In one embodiment of the present invention the mixture to be polymerized further comprises a chainstopper. The chainstopper can be used to limit the molecular weight of the product polymer or alter its physical properties such as glass transition temperature or static charge carrying properties. Suitable chainstoppers include monofunctional phenols, for example: p-cumylphenol; 2,6-xylenol; 4-t-butylphenol; p-cresol; 1-naphthol; 2-naphthol; cardanol; 3,5-di-t-butylphenol; p-nonylphenol; p-octadecylphenol; and phenol. In alternative embodiments of the present invention, the chain stopper may be added: (1) before the reaction is initiated; (2) at an intermediate stage of the polymerization; or (3) after its completion. In such alternative embodiments the chainstopper may exert a controlling effect upon the molecular weight of the product polycarbonate and will control the identity of the polymer terminal groups.

The present invention provides for a very rapid, high throughput polymerization. By allowing for removal of inhibitory byproducts in a continuous manner, the present invention provides a method for polycarbonate polymerization using a continuous reactor system.

The components of starting material: ester-substituted diaryl carbonate, at least one dihydroxy aromatic compound, a transesterification catalyst, and optionally a monofunctional phenol chain stopper may be introduced into the mixing chamber through the same or separate feed inlets. The rates of introduction of said components and said optional monofunctional phenol may be varied to control the molar ratios of the reactants and in this manner to control the physical properties of the product polycarbonate such as molecular weight and endgroup identity. The method of the present invention thus allows for adjustment of the product polycarbonate molecular weight within the context of a continuous process.

In an embodiment, the molecular weight of the product polycarbonate is controlled by adjusting the relative amounts of said dyhydroxy aromatic compound and said diaryl carbonate. Preferably, the starting material comprises between about 0.8 and about 1.2, preferably about 0.95 to about 1.05, and even more preferably about 1.01 to 1.04 moles of ester-substituted diaryl carbonate per mole of dihydroxy aromatic compound present in the mixture.

Also in an embodiment, the ratio of catalyst to starting material is controlled. Preferably, the catalyst comprises from 25 to 500 microequivalents per equivalent of bisphenol, and more preferably from 100 to 250 microequivalents per equivalent of bisphenol, and even more preferably, about 150 microequivalents per equivalent of bisphenol.

Thus, in one preferred embodiment, the mixture comprises between about 0.95 and about 1.05 moles of bis (methyl salicyl) carbonate per mole of bisphenol A and about 100 micromoles (150 ppm) tetrabutyl phosphonium acetate (TPBA) catalyst to give a polycarbonate product ranging from 16 k to 105 k molecular weight (Mw) depending upon the polymerization temperature.

Also, the rate of the reaction is adjusted by the removal of salicylate byproduct. In general, salicylate inhibits the reaction. Thus, removal of salicylate by product significantly affects the molecular weight of the polymer produced. Preferably, the rate of the inhibitory byproduct is further increased as the droplets contact the reactor walls and flow to a collection duct for processing of the polymerization product.

In addition, the rate of the reaction may also be affected by the droplet size. Generally, smaller droplets will have increased diffusion of the inhibitory salicylate byproduct, and thus, a faster reaction rate than larger droplets. Thus, in the method of the present invention the droplets are preferably micron size.

Preferably, the product polycarbonate comprises less than about 1000, more preferably less than about 500, and still more preferably less than about 100 parts per million (ppm) Fries product. Structure VII below illustrates the Fries product structure present in a polycarbonate prepared from bisphenol A. As indicated, the Fries product may serve as a site for polymer branching, the wavy lines of structure VIII indicating polymer chain structure.

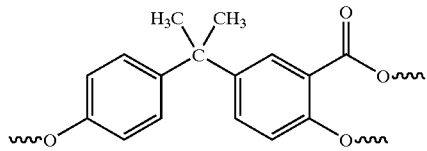

VII

The present invention provides a product polycarbonate having a weight average molecular weight, as determined by gel permeation chromatography, in a range between about 10,000 and about 150,000 daltons, preferably between about 15,000 and about 120,000 daltons, and still more preferably between about 18,000 and about 50,000 daltons.

The present invention also provides reactor systems for melt polymerization as a fine mist. In another aspect, the invention comprises an apparatus for the generation of high molecular weight polycarbonate comprising:

(a) a means to melt monomers comprising at least one ester-substituted diaryl carbonate and at least one dihydroxy aromatic compound and to mix the monomers with at least one melt polymerization catalyst to generate a pre-polymerization reaction mix;

(b) a device to generate a fine mist of predetermined droplet size from the pre-polymerization reaction mix;

(c) a reaction vessel for exposing the mist to a high temperature environment under reduced pressure such that said monomers polymerize and at least a portion of at least one volatile reaction byproduct separates from the droplets;

(d) a vent to remove at least a portion of said volatile byproducts from the droplets; and (e) a device to collect the polymerized polycarbonate product from the reaction vessel.

The monomers may be melted in an single vessel, such as a heated tank. Alternatively, the monomers may be pre-melted and delivered to a tank for mixing together and/or mixing with the transesterification catalyst(s). Or, the monomers may be mixed as they travel (in heated transfer lines) towards the reaction vessel without the use of a separate tank.

In an embodiment, the reactor systems of the present invention further comprise a means to add the at least one catalyst separately from the monomers, but prior to formation of the mist. Thus, in an embodiment, the catalyst is added prior to melting the monomers, and mixed with the monomers as melting occurs. Alternatively, the catalyst may be added during melting or just after the monomers have been melted. The present invention also includes the embodiment where the catalyst (or several catalysts) are added as the melted monomers are pumped towards the vessels where the droplets (mist) are formed. For example, the catalyst may be injected into the melted monomers just prior to formation of the mist. Thus, the present invention contemplate various modes for melting the monomers and mixing with a catalyst prior to formation of the mist.

In an embodiment, the reactor systems of the present invention provide for continuous removal of volatile byproducts as they are formed. For example, in an embodiment, salicylate byproduct is evaporated from the droplets and the vapors removed via a vent. The salicylate is then condensed and discarded in liquid form.

Preferably, the polymerization is conducted in a vacuum ranging from 0.1 to 700 torr. More preferably, the polymerization is conducted in a vacuum ranging from 0.1 to 50 torr. Even more preferably, the polymerization is conducted in a vacuum ranging from 0.1 to 5 torr.

Also, preferably, the temperature at which said monomers are melted ranges from 125° C. to 250° C. More preferably, the temperature at which said monomers are melted ranges from 140° C. to 200° C. In an embodiment, the temperature at which said monomers are melted is about 150° C.

Preferably, the majority of droplets have a defined range of size to promote exchange of volatile reaction byproducts. Preferably, the majority of the droplets in the mist range in size from 1–1,000 microns. More preferably, the majority of the droplets in the mist range in size from 1–400 microns. Even more preferably, the majority of the droplets in the mist range in size from 5–50 microns.

Also, in an embodiment, the droplets in the mist will have a preferred range of viscosity, to promote exchange of volatile byproducts. Preferably, the viscosity of the droplets ranges from 0.5 to 500 cp. More preferably the viscosity of the droplets ranges from 1 to 200 cp, and even more preferably the viscosity of the droplets ranges from 5 to 90 cp.

In an embodiment, the device to generate the mist comprises a spray nozzle or an atomizer. Preferably, the device to generate the mist comprises an airless spray nozzle, an atomizer, a rotary atomizer or any other device capable of increasing the surface area of a fluid.

The method of the invention is unique in that it allows for polymerization to occur very rapidly. Thus, the polymer may be exposed to fairly high temperatures as only a short "residence time" at the elevated temperature occurs. Preferably, the temperature used for polymerization ranges from 200° C. to 400° C. More preferably, the temperature used for polymerization ranges from 250° C. to 350° C. Even more preferably, the temperature used for polymerization ranges from 280° C. to 320° C.

The present invention is unique in that high molecular weight polycarbonate is generated within minutes and preferably, with in seconds of exposure to high temperature melt conditions. In an embodiment, using higher temperatures for polymerization results in product being formed more quickly. Thus, an advantage of the present invention is that polymers are exposed to the elevated temperatures typical of melt polymerization for very short periods of time. An added advantage of the present invention is that polymerization is increased further as the droplets contact the reactor walls and flow down to the bottom of the reactor for collection.

In an embodiment, polymerization is allowed to occur for time period required to generate the polymer of interest. Preferably, polymerization comprises time periods of 5 minutes or less. More preferably, polymerization comprises time periods of 3 minutes or less. Even more preferably, polymerization comprises time periods of 1 minute or less.

In an embodiment, the molecular weight of the product polycarbonate is controlled by adjusting the relative amounts of said dyhydroxy aromatic compound and said diaryl carbonate. Preferably, the starting material comprises between about 0.8 and about 1.2, preferably about 0.95 to about 1.05, and even more preferably about 1.01 to 1.04 moles of ester-substituted diaryl carbonate per mole of dihydroxy aromatic compound present in the mixture. Also as discussed herein, there is a preferable amount of catalyst that is used which ranges from 25 to 500 microequivalents catalyst per equivalent of bisphenol, and more preferably from 100 to 250 microequivalents per equivalent of bisphenol, and even more preferably, about 150 microequivalents per equivalent of bisphenol.

Also, the rate of the reaction is adjusted by the removal of volatile byproduct. In an embodiment, the evaporated byproduct is collected as a liquid. In general, volatile byproducts such as salicylate and phenol inhibit the reaction. Thus, when bis(methyl salicyl) carbonate (BMSC) is used, removal of salicylate byproduct significantly affects the polymerization rate. For example, the rate of salicylate removal may be increased by reducing the vapor pressure in the reaction vessel or increasing the surface area exposed to the vent.

In addition, the rate of the reaction may also affected by the droplet size. Generally, smaller droplets will have increased diffusion of the inhibitory salicylate byproduct, and thus, a faster reaction rate than larger droplets. Thus, in the method of the present invention the droplets are preferably micron size.

In an embodiment, the ester-substituted diaryl carbonate used with a reactor of the present invention has structure I as described herein. Preferably, the ester-substituted diaryl carbonate is selected from the group comprising bis(methyl salicyl) carbonate, bis(propyl salicyl) carbonate, and bis(benzyl salicyl) carbonate.

Also in an embodiment, the dihydroxy aromatic compound used with a reactor of the present invention is a bisphenol having structure II described herein. Preferably, the bisphenol is bisphenol A.

Also preferably, the apparatus of the invention is suitable for use with the transesterification catalysts described herein. Also included in the apparatus of the present invention are branching agents as described herein, chainstoppers, and other additives common to the art of polycarbonate polymerization.

The present invention provides for a very rapid, high-throughput polymerization. By allowing for removal of inhibitory byproducts in a continuous manner, the present invention provides a method for polycarbonate polymerization using a continuous reactor system. Thus, the present invention describes a reactor that: (1) heats monomers past their melting points; (2) feeds the melted prepolymerization mixture in the form of a mist to a reactor; (3) allows melt polymerization to occur as a mist and on the reactor walls under vacuum and high temperature by providing a predetermined residence time for the reaction; (4) removes inhibitory volatile byproducts from the polymerization reaction as polymerization is occurring; and (5) conveys and discharges the resulting polymer in a continuous fashion. Preferably, the volatile byproducts of the reaction are quickly and efficiently removed from the melt.

For example, polymerization of bisphenol A and bis(methyl salicyl) carbonate (BMSC) provides high molecular weight polycarbonate with significantly faster reaction rates and using lower temperatures than other melt polymerization protocols. However, salicylate is an inhibitory byproduct produced as polymerization occurs, and the reaction will not proceed when the salycilate is not removed. Thus, a reactor of the present invention dramatically improves the efficiency of polycarbonate production from bisphenol A and BMSC. Alternatively, the reactor may be used to remove phenol, another volatile byproduct common to melt polymerization. Thus, the present invention may be used in polycarbonate polymerizations other than BMSC-mediated polymerization.

By removing inhibitory byproducts as polymerization occurs, the reactor of the present invention reduces the amount of time the polymer must be exposed to high temperature conditions, thereby increasing the reaction rate and reducing the amount of unwanted byproducts. This results in a reduction of non-volatile by-products, such as Fries byproducts, as well.

The present invention provides numerous advantages over the prior art. Polymerization by the melt process typically involves continuously stirred tank reactors (CSTR) at the beginning of the polymerization reaction when viscosity is low and the removal of the reaction products is easy. As polymerization progresses and the viscosity becomes significant, the creation of large interfacial area is needed. In some cases a large interfacial surface area is realized by the inclusion of mixers in the reactors. These mixers maintain a low film thickness on the available surface area within the reactor. Alternatively, reactors have been described which are designed to create an interfacial area using a melt drop technology that allows low molecular weight polymer to flow down wires or through perforated plates in the form of fine strands. The relatively large interfacial area aids in providing small path lengths for phenol diffusion out of the polymer.

In contrast to other known reactors, the reactor of the present invention takes advantage of the low viscosity of melt monomers to allow polymerization to occur in a mist spray. The reactor of the present invention can extrude a bead of polymer which requires little processing. The reactor of the present invention results in a reduction in operating costs as a result of higher productivity in the production of polycarbonate. Copolymers of polycarbonate can also be produced in the same reactor with somewhat modified parameters.

A schematic of the present invention is shown in FIG. 1. Monomers 25 such as bisphenol A (BPA) and bis(methyl salicyl) carbonate (BMSC) with the appropriate catalyst and optionally, other co-monomers such as adipic acid, dodecanoic diacid (DDDA) and the like are introduced into the inlet port 10 and carried via mixer feeder 20 to melt tank 30 that is heated by heaters 40. The pre-polymerization mix is then melted at low temperature, ~150° C., and pumped using a heated pump 50 and heated lines 55 into reaction chamber 60 via nozzle or atomizer 80 to create a fine mist 90. The reaction chamber may be made of glass or any other material stable to the chemicals used for polymerization and the reaction conditions (high temperature, reduced pressure). Preferably, the reaction chamber comprises heaters 70, such as an oil jacket or electric heater, to heat the chamber to the correct temperature for polymerization.

Also preferably, the reaction vessel 60 is equipped with one or more vacuum ports/vents 120. Vacuum port 120 is connected via line 130 to cold trap 140 and vacuum pump 155. The vacuum vent(s) 120 are operated at reduced pressure, usually in a range between about 1 and about 700 mm Hg, preferably between about 10 and about 50 mm Hg. The vents allow for volatilization of the byproducts and their removal from the polymerization mix. Thus, the apparatus provides a means to collect the byproduct as a liquid condensate 150 for subsequent processing. In a preferred embodiment, screen 110 is used to prevent reflux of polymer mist into vacuum port 120.

The spray nozzle/atomizer 80 is designed to produce a mist 90 having a droplets sized on the order of microns. Preferably, the droplets comprise a very large surface area and of viscosity of approximately 5 to 90 cp. Also preferably, small quantities of branching agents and/or chain stoppers may be incorporated in the initial low viscosity melt as desired. Once the mist is generated, polymerization is allowed to proceed for a set amount of time in the reaction chamber 60.

Generally, polymerization is allowed to occur in the reaction chamber 60 for time period required to generate the polymer of interest. As shown in the Examples section herein, polymerization periods of 3 min or less resulted in polymers ranging from 16 k to over 100 k Mw (Table 1).

After the designated polymerization time, polymer melt 100 flows to heated, vented extruder 160 and is transferred to cooling trough 170. The polymer products are then sized using pelletizer 180 to generate the final polycarbonate in pellet form 190. Of course, product in other forms (e.g. extruded as a larger piece) is included in the present invention.

Thus, the present invention provides methods and reactor systems for rapid and efficient high-throughput polycarbonate synthesis. Because inhibitory by products are continuously removed, the methods and systems of the present invention provide the ability to generate high molecular weight polycarbonate with polymerization times ranging from seconds to less than 10 min. In addition, problems such as processing large volumes of highly viscous product are avoided, since there is a steady removal of polycarbonate particles over the course of the reaction. Also, processing of volatile byproducts away from the polycarbonate product is greatly simplified.

Polycarbonates prepared using the method of the present invention may be blended with conventional additives such as heat stabilizers, mold release agents and UV stabilizers and molded into various molded articles such as optical disks, optical lenses, automobile lamp components and the like. Further, the polycarbonates prepared using the method of the present invention may be blended with other polymeric materials, for example, other polycarbonates, polyestercarbonates, polyesters and olefin polymers.

EXAMPLES

Example 1

A reactor for spray melt polymerization is illustrated in FIG. 1. Thus, as shown, a funnel type port (10) was used to introduce the components into the system. Monomers and catalysts were transferred from the port (10) to the mixer (30) using a feeder (20). The mixer (30) of the present invention was a 1000 cc glass flask (or kettle) with a stirrer and a bottom port, and was heated using a flexible Omega heater cord (40) wrapped around the kettle. The mix of melted monomers and catalyst was then gravity fed to a Zenith gear pump (50) having a pumping rate of 24 pounds per hr. The pump and lines were temperature controlled with a Wattlow temperature controller to keep the temperature of the melt at about 150° C.

The melted pre-reaction mix was pumped under pressure (150 PSI) via stainless steel flexible corrugated transfer lines (¼ inch inner diameter (ID)) (55) into the reaction vessel (60) via a nozzle (80) to create a spray mist (90). The nozzle used in the experiment was a HAGO Precision Nozzle (rated at 2 gallon/hr @ 100 PSI). The reaction vessel was a 2000 cc glass reactor that was capable of holding a vacuum. In addition, the reaction vessel included a two port upper lid and a single bottom port. The reaction vessel was heated by a constant temperature forced air oven (1 cu ft) (70) to a temperature of 280° C. to 320° C. during the course of the polymerization. The reaction vessel included a screen deflector (110) to prevent the polymer from entering the vent (120). Vent (120) was attached to a vacuum pump (155) so as to remove volatile components (via a ¾ inch ID vacuum line) (130) from the reaction. This allowed for recovery of condensed byproduct (i.e. salicylate) (150) using a cold trap (140). In this system, the cold trap was a kettle kept at ice point or 0° C. The glass reaction vessel had a port at the bottom which was connected to a heated and vented extruder (160) and cooling trough (170). Thus, the collected polymerized product (100) flowed down the reactor walls to enter a 16 mm twin-screw PRISM extruder (160) via the bottom port on the reaction flask. The extruder, operating at a temperature of 280° C. to 320° C. performed the final devolatilization of any residual methyl salycilate, and sent a bead of polymer through the cooling bath (170) to a PRISM pelletizer (180), where small pellets were cut at room temperature.

Example 2

Three experiments were performed in which 1.0000/1.4735 ratio (by weight) of bisphenol A (BPA) and bis (methyl salicylic) carbonate (BMSC) (228.3 g BPA and 330.6 g BMSC) with 150 ppm tetrabutylphosphonium acetate (TBPA) catalyst was added to the "melting pot". Pump and lines from the melting pot to the spray nozzle were kept at 150° C. A positive displacement Zenith gear pump with a pumping rate of 24 pounds per hr was used to transmit the melt to a mist nozzle placed in a glass vessel under a vacuum of 5 torrs. A cold trap was installed on the vacuum line to capture the free salicylate. The reaction vessel was kept at constant temperature in a large capacity forced air oven.

It was found that polymers ranging from 16K to 105K Mw were made with polymerization times ranging from 3 min to 24 seconds. Notably, increasing polymerization temperatures were associated with reduced times needed for polymerization. Thus, at 280° C. the polymerization time to generate a 16.6 K Mw product was 3 min, whereas at 300° C. only 24 sec was required to generate a 23.7 k Mw polymer, and at 320° C. only 30 sec was required to generate a product of over 100 k Mw.

TABLE 1

| Experiment | Oven Temp (° C.) | Amount Sprayed | Run Duration | Salicylate Recovered | Mn | Mw | Mw/Mn |
|---|---|---|---|---|---|---|---|
| 1 | 280 | 50 g | 3 min | 21 g | 7.9 k | 16.6 k | 2.25 |
| 2 | 300 | 67 g | 24 sec | 27 g | 11.5 k | 23.7 k | 2.3 |
| 3 | 320 | 50 g | 30 sec | 27 g | 36 k | 105 k | 2.9 |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A method for the production of high molecular weight polycarbonate comprising:
   (a) melting monomers comprising an ester-substituted diaryl carbonate and a dihydroxy aromatic compound and mixing with at least one melt polymerization catalyst to generate a pre-polymerization reaction mix;
   (b) treating the reaction mix to generate a mist comprising droplets of the reaction mixture of defined droplet size;
   (c) exposing the mist to a high temperature environment at reduced pressure under conditions such that the monomers polymerize; and
   (d) collecting polymerized polycarbonate product.

2. The method of claim 1, wherein the at least one catalyst is added separately from the monomers, but prior to formation of the mist.

3. The method of claim 1, wherein at least a portion of at least one volatile reaction byproduct is separated from the droplets.

4. The method of claim 3, further comprising continuous removal of the at least one volatile byproduct.

5. The method of claim 1, wherein the reduced pressure comprises a vacuum of 0.1 to 700 torr.

6. The method of claim 1, wherein the reduced pressure comprises a vacuum of 0.1 to 50 torr.

7. The method of claim 1, wherein the temperature at which the pre-polymerization mix is melted comprises a range from 125° C. to 250° C.

8. The method of claim 1, wherein the majority of droplets in the mist range in size from 1 to 1,000 microns.

9. The method of claim 1, wherein the majority of droplets in the mist range in size from 1 to 400 microns.

10. The method of claim 1, wherein the majority of droplets in the mist range in size from 5 to 50 microns.

11. The method of claim 1, wherein the viscosity of the droplets ranges from 0.5 to 500 cp.

12. The method of claim 1, wherein the viscosity of the droplets ranges from 1 to 200 cp.

13. The method of claim 1, wherein a spray nozzle or an atomizer is used to generate the mist.

14. The method of claim 1, wherein the temperature used for polymerization comprises a range of from 200° C. to 400° C.

15. The method of claim 1, wherein the temperature used for polymerization comprises a range from 250° C. to 350° C.

16. The method of claim 1, wherein the temperature used for polymerization comprises a range from 280° C. to 320° C.

17. The method of claim 1, wherein polymerization to generate the polycarbonate product occurs in less than 5 minutes.

18. The method of claim 1, wherein polymerization to generate the polycarbonate product occurs in less than 3 minutes.

19. The method of claim 1, wherein said ester-substituted diaryl carbonate has structure I

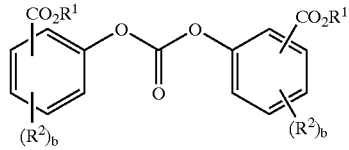

wherein $R^1$ is independently at each occurrence $C_1$–$C_{30}$ alkyl group, $C_4$–$C_{30}$ cycloalkyl group, or $C_4$–$C_{30}$ aryl group, $C_1$–$C_{30}$ alkoxyl, $C_6$–$C_{30}$ aryloxy, $C_6$ to $C_{30}$ aralkyl, $C_6$ to $C_{30}$ aralkyloxy, $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, and $C_1$–$C_{20}$ acylamino group; and b is independently at each occurrence an integer 0–4.

20. The method of claim 19, wherein the ester-substituted diaryl comprises bis(methyl salicyl) carbonate, bis(propyl salicyl) carbonate or bis(benzyl salicyl) carbonate.

21. The method of claim 1, wherein the dihydroxy aromatic compound is a bisphenol having structure II

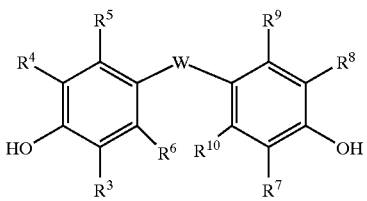

II wherein $R^3$–$R^{10}$ are independently a hydrogen atom, halogen atom, nitro group, cyano group, $C_1$–$C_{30}$ alkyl group $C_4$–$C_{30}$ cycloalkyl group, or $C_6$–$C_{30}$ alkyl group, a $C_1$–$C_{30}$ alkoxy, $C_4$–$C_{30}$ cycloalkoxy or $C_6$–$C_{30}$ aryloxy; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical of the group,

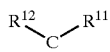

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

22. The method of claim 21, wherein the bisphenol is bisphenol A.

23. The method of claim 1, wherein the catalyst comprises a quaternary ammonium compound, a quaternary phosphonium compound or a mixture thereof.

24. The method of claim 23, wherein the quaternary ammonium compound has structure V

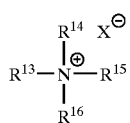

V wherein $R^{13}$–$R^{16}$ are independently a $C_1$–$C_{20}$ alkyl group, $C_4$–$C_{20}$ cycloalkyl group or a $C_4$–$C_{20}$ aryl group and $X^-$ is an organic or inorganic anion.

25. The method of claim 23, wherein the quaternary ammonium compound is tetramethylammonium hydroxide.

26. The method of claim 23, wherein said phosphonium compound comprises structure VI

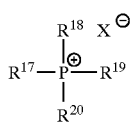

VI wherein $R^{17}$–$R^{20}$ are independently a $C_1$–$C_{20}$ alkyl group, $C_4$–$C_{20}$ cycloalkyl group or a $C_4$–$C_{20}$ aryl group and $X^-$ is an organic or inorganic anion.

27. The method of claim 23, wherein the quaternary phosphonium compound is tetrabutylphosphonium acetate.

28. The method of claim 1, wherein the catalyst comprises at least one alkali metal hydroxide, alkaline earth hydroxide or mixture thereof.

29. The method of claim 28, wherein the alkali metal hydroxide is sodium hydroxide.

30. The method of claim 1, wherein the catalyst comprises at least one alkali metal salt of a carboxylic acid, or an alkaline earth salt of a carboxylic acid, or a mixture thereof.

31. The method of claim 30, in which the alkali metal salt of a carboxylic acid is Na2Mg EDTA.

32. The method of claim 1, wherein the transesterification catalyst comprises at least one salt of a non-volatile inorganic acid.

33. The method of claim 32, wherein the salt of a non-volatile acid comprises $NaH_2PO_3$, $NaH_2PO_4$, $Na_2HPO_3$, KH2PO4, CsH2PO4 or Cs2H2PO4.

34. The method of claim 1, further comprising incorporation of at least one branching agent into the reaction mix.

35. The method of claim 1, further comprising incorporation of at least one chainstopper into the reaction mix.

36. The method of claim 1, wherein the molecular weight of the product polycarbonate is controlled by adjusting the relative amounts of the dyhydroxy aromatic compound and the diaryl carbonate present in the polymerization reaction mix.

37. The method of claim 1, wherein the rate of polymerization is controlled by adjusting the size of the spray mist droplets formed.

38. The method of claim 1, wherein the rate of polymerization is controlled by the rate of removal of byproduct from the droplets.

39. A method for preparing polycarbonate comprising:

(a) melting monomers comprising a dihydroxy aromatic compound and bis(methyl salicyl) carbonate and mixing with at least one transesterification catalyst to generate a pre-polymerization reaction mix;

(b) treating the mix to generate a fine mist comprising droplets of the reaction mixture of predetermined droplet size;

(c) exposing the mist to a high temperature environment at reduced pressure under conditions such that said monomers polymerize and at least a portion of at least one volatile reaction byproduct separates from said droplets;

(d) removing at least a portion of the at least one volatile byproduct from the droplets; and (e) collecting polymerized polycarbonate product.

40. The method of claim 39, wherein the at least one catalyst is added separately from the monomers, but prior to formation of the mist.

41. The method of claim 39, wherein said dihydroxy aromatic compound is a bisphenol having structure II

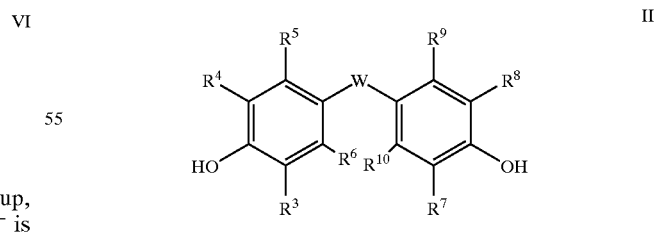

II wherein $R^3$–$R^{10}$ are independently a hydrogen atom, halogen atom, nitro group, cyano group, $C_1$–$C_{30}$ alkyl group $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group, $$R^{12}\diagdown_{C}\diagup R^{11}$$

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

42. The method of claim 41, wherein the bisphenol is bisphenol A.

43. The method of claim 39, further comprising continuous removal of volatile salicylate product from the droplets as polymerization progresses.

44. The method of claim 39, wherein the reduced pressure comprises a vacuum of 0.1 to 700 torr.

45. The method of claim 39, wherein the reduced pressure comprises a vacuum of 0.1 to 50 torr.

46. The method of claim 39, wherein the temperature at which the pre-polymerization mix is melted comprises a range of from 125° C. to 250° C.

47. The method of claim 39, wherein the majority of droplets in the mist range in size from 1 to 1,000 microns.

48. The method of claim 39, wherein the majority of droplets in the mist range in size from 1 to 400 microns.

49. The method of claim 39, wherein the majority of droplets in the mist range in size from 5 to 50 microns.

50. The method of claim 39, wherein the viscosity of the droplets comprises a range of from about 0.5 to 500 cp.

51. The method of claim 39, wherein the viscosity of the droplets comprises a range of from about 1 to 200 cp.

52. The method of claim 39, wherein a spray nozzle or an atomizer is used to generate the mist.

53. The method of claim 39, wherein the temperature used for polymerization comprises a range of from 200° C. to 400° C.

54. The method of claim 39, wherein polymerization to generate the polycarbonate product occurs in less than 5 minutes.

55. The method of claim 39, wherein polymerization to generate the polycarbonate product occurs in less than 3 minutes.

56. The method of claim 39, wherein the molecular weight of the product polycarbonate is controlled by controlling the, relative amounts of dihydroxy aromatic compound and bis(methyl salicyl) carbonate in the polymerization reaction mix.

57. The method of claim 39, wherein the rate of polymerization is controlled by controlling the size of the spray mist droplets.

58. The method of claim 39, wherein the rate of polymerization is controlled by the rate of removal of byproduct from the droplets.

59. An apparatus for the generation of high molecular weight polycarbonate comprising:

(a) a means to melt monomers comprising at least one ester-substituted diaryl carbonate and at least one dihydroxy aromatic compound and mix the monomers with at least one melt polymerization catalyst to generate a pre-polymerization reaction mix;

(b) a device to generate a fine mist of predetermined droplet size from the pre-polymerization reaction mix;

(c) a reaction vessel for exposing the mist to a high temperature environment under reduced pressure such that said monomers polymerize and at least a portion of at least one volatile reaction byproduct separates from said droplets;

(d) a vent to remove at least a portion of said volatile byproducts from the droplets; and (e) a device to collect the polymerized polycarbonate product from the reaction vessel.

60. The apparatus of claim 59, further comprising a means to add the at least one catalyst separately from the monomers, but prior to formation of the mist.

61. The apparatus of claim 59, wherein the reduced pressure comprises a vacuum of from 0.1 to 700 torr.

62. The apparatus of claim 59, wherein the reduced pressure comprises a vacuum of from 0.1 to 50 torr.

63. The apparatus of claim 59, wherein the temperature at which the pre-polymerization mix is melted comprises a range of from 125° C. to 250° C.

64. The apparatus of claim 59, wherein the majority of droplets in the mist range in size from 1 to 1,000 microns.

65. The apparatus of claim 59, wherein the majority of droplets in the mist range in size from 1 to 400 microns.

66. The apparatus of claim 59, wherein the majority of droplets in the mist range in size from 5 to 50 microns.

67. The apparatus of claim 59, wherein the viscosity of the droplets ranges from 0.5 to 500 cp.

68. The apparatus of claim 59, wherein the viscosity of the droplets ranges from 1 to 200 cp.

69. The apparatus of claim 59, wherein the device to generate the mist comprises a spray nozzle or an atomizer.

70. The apparatus of claim 59, wherein the temperature used for polymerization comprises a range of from 200° C. to 400° C.

71. The apparatus of claim 59, wherein polymerization to generate the polycarbonate product occurs in less than 5 minutes.

72. The apparatus of claim 59, wherein polymerization to generate the polycarbonate product occurs in less than 3 minutes.

73. The apparatus of claim 59, further comprising a means to condense the evaporated byproduct for collection as a liquid.

74. The apparatus of claim 59, wherein said ester-substituted diaryl carbonate has structure I

I

[Structure with $CO_2R^1$ groups and $(R^2)_b$ substituents on two aryl rings connected via carbonate linkage]

wherein $R^1$ is independently at each occurrence $C_1$–$C_{30}$ alkyl group, $C_4$–$C_{30}$ cycloalkyl group, or $C_4$–$C_{30}$ aryl group, $C_1$–$C_{30}$ alkoxyl, $C_6$–$C_{30}$ aryloxy, $C_6$ to $C_{30}$ aralkyl, $C_6$ to $C_{30}$ aralkyloxy, $R^2$ is independently at each occurrence a halogen atom, cyano group, nitro group, $C_1$–$C_{20}$ alkyl group, $C_4$–$C_{20}$ cycloalkyl group, $C_4$–$C_{20}$ aryl group, $C_1$–$C_{20}$ alkoxy group, $C_4$–$C_{20}$ cycloalkoxy group, $C_4$–$C_{20}$ aryloxy group, $C_1$–$C_{20}$ alkylthio group, $C_4$–$C_{20}$ cycloalkylthio group, $C_4$–$C_{20}$ arylthio group, $C_1$–$C_{20}$ alkylsulfinyl group, $C_4$–$C_{20}$ cycloalkylsulfinyl group, $C_4$–$C_{20}$ arylsulfinyl group, $C_1$–$C_{20}$ alkylsulfonyl group, $C_4$–$C_{20}$ cycloalkylsulfonyl group, $C_4$–$C_{20}$ arylsulfonyl group, $C_1$–$C_{20}$ alkoxycarbonyl group, $C_4$–$C_{20}$ cycloalkoxycarbonyl group, $C_4$–$C_{20}$ aryloxycarbonyl group, $C_2$–$C_{60}$ alkylamino group, $C_6$–$C_{60}$ cycloalkylamino group, $C_5$–$C_{60}$ arylamino group, $C_1$–$C_{40}$ alkylaminocarbonyl group, $C_4$–$C_{40}$ cycloalkylaminocarbonyl group, $C_4$–$C_{40}$ arylaminocarbonyl group, and $C_1$–$C_{20}$ acylamino group; and b is independently at each occurrence an integer 0–4.

75. The apparatus of claim 74, wherein the ester-substituted diaryl carbonate is selected from the group comprising bis(methyl salicyl) carbonate, bis(propyl salicyl) carbonate, and bis(benzyl salicyl) carbonate.

76. The apparatus of claim 59, wherein the dihydroxy aromatic compound is a bisphenol having structure II

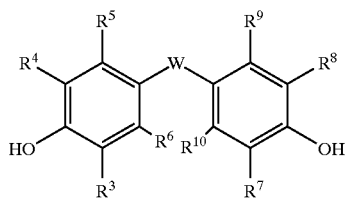

II wherein $R^3$–$R^{10}$ are independently a hydrogen atom, halogen atom, nitro group, cyano group, $C_1$–$C_{30}$ alkyl group $C_4$–$C_{30}$ cycloalkyl group, or $C_6$–$C_{30}$ aryl group, a $C_1$–$C_{30}$ alkoxy, $C_4$–$C_{30}$ cycloalkoxy or $C_6$–$C_{30}$ aryloxy; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group,

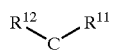

wherein $R^{11}$ and $R^{12}$ are independently a hydrogen atom, $C_1$–$C_{20}$ alkyl group, $C_4$–$C_{20}$ cycloalkyl group, or $C_4$–$C_{20}$ aryl group; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

77. The apparatus of claim 76, wherein said bisphenol is bisphenol A.

78. The apparatus of claim 59, wherein the molecular weight of the product polycarbonate is controlled by controlling the relative amounts of dihydroxy aromatic compound and diaryl carbonate in the polymerization reaction mix.

79. The apparatus of claim 59, wherein the race of polymerization is controlled by controlling the size of the spray mist droplets.

80. The apparatus of claim 59, wherein the race of polymerization is controlled by the race of removal of byproduct from the droplets.

* * * * *